April 26, 1966 M. R. FIELDS ETAL 3,247,548
APPARATUS FOR MAKING A MOLDED ARTICLE
Filed May 28, 1962
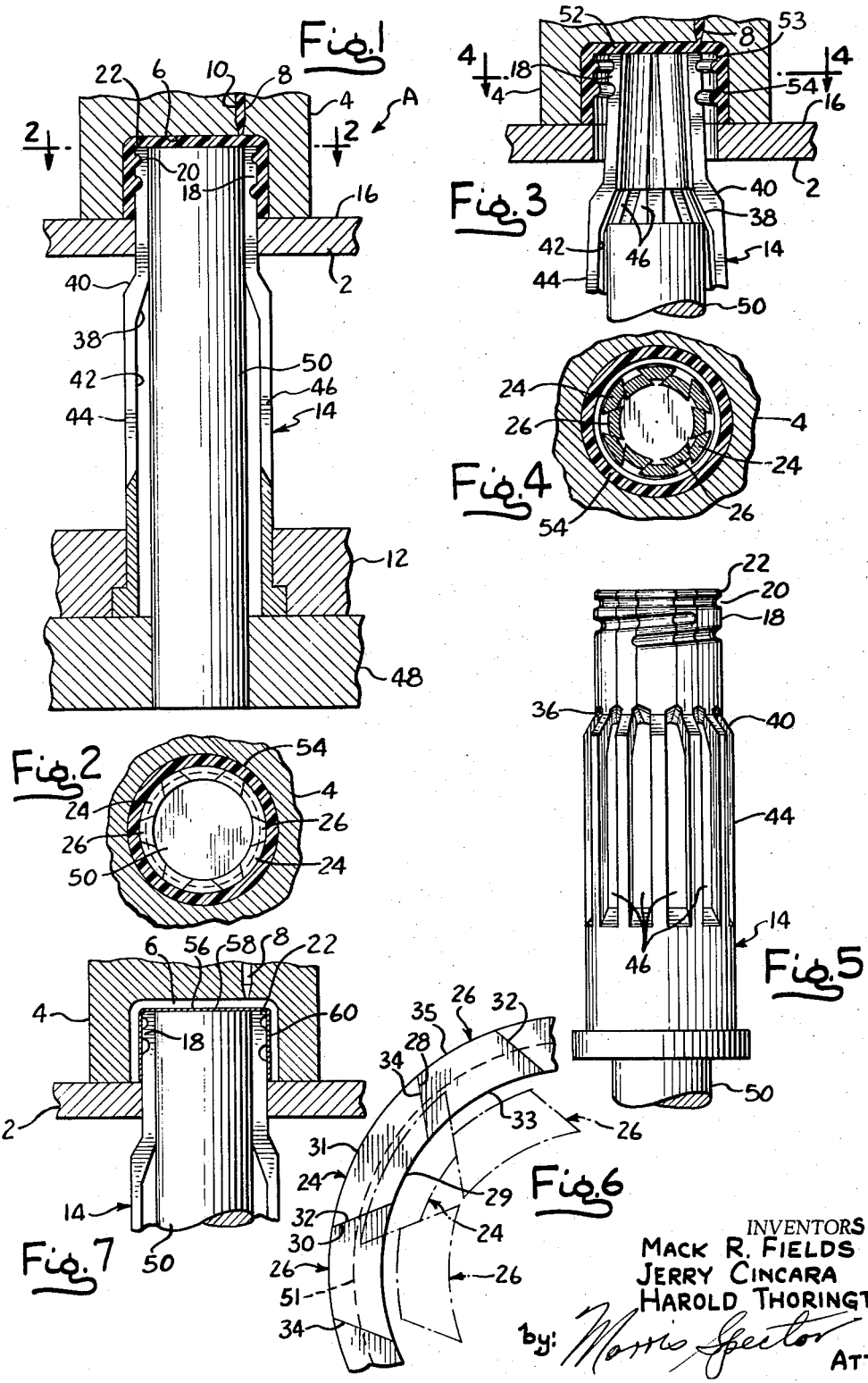
INVENTORS
MACK R. FIELDS
JERRY CINCARA
HAROLD THORINGTON
by: Morris Spector
ATTY.

United States Patent Office 3,247,548
Patented Apr. 26, 1966

3,247,548
APPARATUS FOR MAKING A MOLDED ARTICLE
Mack R. Fields, Libertyville, Ill., and Jerry Cincara and Harold Thorington, Cedar Rapids, Iowa, assignors, by mesne assignments, to Roehr Metals & Plastics Company, a limited partnership, Hillside, N.J.
Filed May 28, 1962, Ser. No. 198,107
10 Claims. (Cl. 18—34)

This invention relates in general to apparatus for molding threaded articles, and more particularly to an apparatus for making threaded container caps.

It is an object of the present invention to provide an apparatus for making a molded internally threaded article, such as a container cap, in which a threaded die and mold cooperate to form a continuous thread on the cap during the molding operation, and wherein the die and completed cap may be axially separated from one another without rotation of either.

It is a further object of the present invention to provide an apparatus of the type stated that produces a cap wherein the hoop strength at the thread is maintained without an excessive wall thickness of plastic in the region of the thread.

It is also an object of the present invention to provide apparatus of the type stated in which the die thread, in its thread-forming position, forms a continuous thread so that a corresponding continuous thread may be formed on the cap, but wherein the die is constructed in such a manner that it may be contracted a sufficient amount to clear the thread that it forms on the cap, whereby the cap may be stripped from the die without having to unscrew it therefrom.

It is an additional object of the present invention to provide an apparatus embodying a unique radially contractable and expandable die that is able to produce an article having a cavity and a continuous annular radial deformation at the cavity. That deformation may be a groove, rib, thread, or the like.

It is another important object of the present invention to provide an apparatus of the type stated that may be used to produce an all plasic cap or a plastic coated sheet metal cap, in which latter case the thread on the sheet metal blank is formed during the molding operation.

The attainment of the above and further objects of the present invention will be apparent from the following specification taken in conjunction with the accompanying drawing forming a part thereof.

In the drawing:

FIG. 1 is a fragmentary longitudinal sectional view of apparatus constructed in accordance with and embodying the present invention and showing a plastic cap made in accordance with the method of the present invention;

FIG. 2 is a fragmentary sectional view taken along the line 2—2 of FIG. 1;

FIG. 3 is a fragmentary longitudinal sectional view of a part of the apparatus of FIG. 1 and showing the thread-forming die in its retracted position preparatory to separation of the die from the cap;

FIG. 4 is a fragmentary sectional view taken along line 4—4 of FIG. 3;

FIG. 5 is a side elevational view of the die and pin which form part of the present invention, the die being in the expanded position;

FIG. 6 is a fragmentary top plan view, on an enlarged scale, of a part of the die shown in FIG. 5; and FIG. 7 is a fragmentary longitudinal sectional view of the apparatus and showing the manner of using the apparatus to make a plastic coated sheet metal cap.

Referring now in more detail and by reference characters to the drawing, which illustrates a preferred embodiment of the present invention, A designates apparatus for making a molded threaded plastic cap. The apparatus A comprises a mold member 2 which cooperates with a mold member 4 having a mold cavity 6 therein. The mold member 4 has a mold gate 8 which is in communication with a suitable injection molding apparatus from which plastic 10 under high pressure may be introduced into the mold cavity 6 to mold the cap. The injection molding apparatus that supplies plastic to the mold gate 8 is conventional, and is, therefore, not shown or described.

Rigidly mounted at one end on a support plate 12 and extending outwardly therefrom is a tubular core or die 14 which projects through the mold member 2, terminating outwardly of the face 16 thereof in a helically threaded end 18. At the axially outer end of the thread are radial deformations, such as an annular groove 20 that provides an annular end rib 22, for purposes presently more fully appearing. The core 14 is longitudinally divided into a plurality of circumferentially disposed sections, one group of like sections being designated at 24 and the other 26. Each section 24 has opposite longitudinal planar sides 28, 30 that converge toward a line that is between that die section 24 and the central axis of the die 14, and each section 26 has opposite longitudinal planar sides 32, 34 that converge toward the exterior of the core 14. Each die section 24 thus has an arcuate inner and outer surface 29, 31, the latter being the longer, while each die section 26 has inner arcuate surface 33 that is longer than outer arcuate surface 35. The sides 28, 30, 32, 34 extend from the very end of the core toward the secured end of the core 14, terminating at 36, which is substantially beyond the thread 18. Approximately at 36 the sections 24, 26 are internally and externally formed with conical shoulders 38, 40 that merge into internal and external diametrally enlarged portions 42, 44, and approximately at the shoulders 38, 40, the die sections 24, 26 are separated by slots 46 that terminate spaced from the secured end of the die 14.

Rigidly mounted on a shiftable support 48 is a center pin 50 which extends coaxially through the core 14 and is adapted to terminate flush with the threaded end 18 when the appartus is in the cap-molding position, as shown in FIG. 1. The core sections 24, 26 are resilient in a radial direction and when radially unsupported are in a retracted or collapsed position shown, for example, in FIG. 3 and in broken lines in FIG. 6. However, the diameter of the pin is such that when the pin 50 is in the position shown in FIG. 1, the sections 24, 26 are held in the expanded position by the pin 50 so that the respective adjacent die section side 28, 30, 32, 34 are firmly abutting and the thread 18, groove 20 and rib 22 are respectively continuous from one core section to the next die section.

In use, the appartus A is in the molding position shown in FIG. 1 whereupon the plastic 10 is introduced into the mold cavity 6 to mold the plastic cap having an annular skirt 54 with a thread substantially companion to the thread 18. Likewise, a groove 53 is formed in the cap that is companion with the rib 22. The groove 53 in the cap may be used to retentively receive a conventional wax-impregnated sealing disk. Since the sections 24, 26 are backed by the pin 50, and the sides 28, 30, 32, 34 of a respective section are in abutting relationship, the plastic does not enter between the core sections, whereby the thread on the cap skirt 54 is continuous as is the thread on the core.

When the mold cap 52 is in condition for removal from the mold member 4, the pin 50 may be axially withdrawn from supporting relationship with the threaded end 18 as, for example, to the position shown in FIG. 3. The resiliency of the core sections 24, 26 will cause them to move radially a sufficient amount such that the die thread 18 and rib 22 clear the cap skirt thread (FIGS. 3 and 4), whereupon the cap 52 may be separated from the threaded end of the core without the necessity of unscrewing one from the other.

Due to the converging and diverging sides 28, 30, 32, 34 on the sections 24, 26, the die sections 24, 26 do not move radially equal amounts when the core is contracted. The die sections 26 first move radially inwardly sufficiently to clear the cap thread and groove 53 and also sufficiently to provide clearance to enable the remaining die sections 24 thereafter to shift radially inwardly. As best seen in FIG. 6 a part of the core is shown in full lines in the expanded position and in broken lines in the contracted position. The sections 24 preferably shift such that the radially outermost part of the surfaces 31 lie radially inwardly of the root diameter 51 (FIG. 6) of the thread that is provided when the core is in its expanded position.

The pin 50 may be axially shifted to the position shown in FIGS. 1 and 2 prior to molding the next cap. This movement of the pin 50 expands the core 14, moving the sections 24, 26 radially outwardly until the sides 28, 30, 32, 34 of the respective sections are in abutting relationship.

As seen by reference to FIG. 7, the appartus of the present invention may be used to fabricate a plastic coated sheet metal cap. To this end a thin gauge (for example, .008 inch to 0.12 inch) sheet metal shell 56 having an end wall 58 and an unthreaded cylindrical skirt 60 is telescoped over the threaded end 18 of the core 14 prior to enclosing the two in the mold cavity 6. When plastic is introduced into the mold cavity 6, the pressure of the plastic is applied to the skirt 60 to deform the metal of the skirt to form a thread thereon that is substantially compainion with the thread on the core 14. At the same time, the shell 56 is coated with plastic to give it a decorative appearance.

Thermoplastic resins such as polystyrene, polypropylene, and high density polyethylene are particularly suitable for use in connection with the present invention. The invention also contemplates the use of thermosetting resins such as phenolformaldehyde resins.

In compliance with the requirements of the patent statutes, we have herein shown and described a preferred embodiment of the invention. It is, however, to be understood that the invention is not limited to the precise construction herein shown, the same being merely illustrative of the priniciples of the invention.

What is considered new and sought to be secured by Letters Patent is:

1. In combination, a core having a part with a radial deformation extending therearound, said part being longitudinally divided into a plurality of circumferentially disposed sections that surround the axis of said part, said core sections being movable from an article-forming position in which the adjacent sections are abutting and form a continuous radial deformation from one section to the next section to a retracted position in which adjacent sections are radially inwardly shifted, the sections having longitudinally extending radially interfering sides such that radial inward shifting of one group of sections provides clearance for radial inward shifting of the remaining sections said sections being resilient in a radial direction and being urged by said resiliency toward one of their said positions, and means opposing said resiliency of the sections for moving the section to the other of said positions.

2. Apparatus for making a molded article having a cavity, said apparatus comprising a core having a part divided into a plurality of sections secured together against relative movement at one end and their opposite ends being free of one another and being movable radially with respect to one another from an extended position to a retracted position, mold means having a mold cavity for receiving said one end of the core and for molding material around the core to form the article with a cavity having a radial formation that is substantially a counterpart of the external core surface, said core in the extended position of the sections being of a shape which prevents direct axial separating movement of the core from the article molded around it and in the retracted position permits the article to be separated from the core by axially shifting one without rotation of either, the core in the extended position having a core molding surface continuous from one section to the next section and having radially interfering sides that prevent some of the sections from shifting to their retracted positions without a greater amount of shifting of the remaining sections to their retracted positions, whereby the radial shifting of the remaining sections provides clearance for the radial shifting of the first-mentioned sections, and means for moving the core sections from one of said positions to the other.

3. Apparatus for making an internally threaded article that includes molded plastic, said apparatus comprising a core having a thread-forming part divided into a plurality of longitudinally extending arcuate sections secured together against relative movement at one end and their opposite ends being free of one another, mold means having a mold cavity for receiving the free ends of the core, said free ends of the core sections being radially movable from an extended position to a retracted position, in the extended position the core being of a shape to prevent direct longitudinal retractive separation of the core from the article and in the retracted position the core clearing the thread formed on the article a sufficient amount to enable the article to be separated from the core by axially shifting one without rotation of either, the core sections in the extended position forming a closed loop from one section to the next section and with adjacent core sections having abutting radially interfering sides that prevent alternate sections from radially shifting to their retracted positions without a greater amount of radial shifting of the remaining alternate sections to their retracted positions, and means for moving different core sections radially different amounts to shift the core section from one of said positions to the other.

4. Apparatus according to claim 3 wherein the last mentioned means includes a member axially slidable within the core and backing the core sections in their extended positions.

5. In an apparatus for making a molded plastic article having an internally threaded portion, a core having a threaded part longitudinally divided into a plurality of arcuate sections adapted to be enclosed in a mold, one end of some of the core sections being free of the other core sections and the free ends of the last-mentioned core sections being radially movable from an outer thread-forming position in which the adjacent sections are abutting along longitudinal surfaces to a retracted position in which said some of the core sections are radially shifted at least to the root diameter of the thread, the opposite longitudinal surfaces of certain sections converging towards one another in a direction radially outwardly of the longitudinal axis of the core in a manner to enable shifting them radially inwardly to their retracted positions and thereby provide clearance for radial inward shifting of the remaining core sections, and means for moving the core sections from one position to another, said sections being flexible and being flexed to move the free ends thereof from one of said positions to the other.

6. In an apparatus for making a molded plastic article having an internally threaded portion, a core having a threaded part longitudinally divided into a plurality of arcuate sections adapted to be enclosed in a mold, one end of some of the core sections being free of the other core sections and the free end of the last-mentioned core sections being radially movable from an extended thread-forming position in which the adjacent sections are abutting along longitudinal surfaces to a retracted position in which said some of the core sections are radially shifted at least to the root diameter of the thread, the opposite longitudinal surfaces of certain sections converging towards one another in a direction radially outwardly of the longitudinal axis of the core in a manner to enable shifting them radially inwardly to their retracted positions and thereby provide clearance for radial inward shifting of the remaining core sections, and means for moving the core sections from one position to another, said last named means including a pin axially slideable within the core and supporting the core sections in their extended positions, said sections being resilient and moving to their retracted positions when the pin is axially shifted out of supporting relation with the core sections.

7. In combination, a core having a part longitudinally divided into a plurality or circumferentially disposed sections, said core sections being movable from an extended article-forming position in which the adjacent sections are abutting and form a continuous molding surface from one section to the next section to a retracted position in which adjacent sections are radially inwardly shifted, the sections having longitudinally extending radially engaging sides such that radial inward shifting of alternate sections provides clearance for radial inward shifting of the remaining sections, means for securing said alternate sections together at one end of each thereof against relative movement, the opposite ends of said alternate sections being free of one another and said alternate sections being flexible for radial movement of the free ends thereof, from extended to retracted positions, and means for moving the core sections from one position to the other.

8. Apparatus for making a molded article having a cavity, said apparatus comprising a core for use in a mold, said core having a part divided into a plurality of molding surface sections which are movable with respect to one another in a direction radially of the core from an extended molding position wherein they form a loop to a contracted article release position, alternate sections of the core constituting one group and the remaining sections constituting a second group, means fixing one end of each of a number of sections against relative movement with respect to one another, the opposite ends of those sections being movable with respect to one another from the extended to the contracted position, adjacent sections of the core being in contact with one another along surfaces that extend from the inside of the loop to the outside of the loop of the core, said core being of a shape to prevent direct axial separation movement of the molded article from the core when the core is radially extended and to permit such separation when the core is contracted, and in the radially contracted position having one group of sections moved radially inwardly of and overlapped by sections of the other group, and means for moving the core sections from one of their relative positions to the other, in the contracted positions of said core sections the entire molding surfaces of said one group of sections being spaced from contact with the other group to prevent relative rubbing of the parts of the outer surfaces of the sections of one group against the surfaces of the other group.

9. In combination with an apparatus as defined in claim 8, a mold having a mold cavity, a part of the said loop portion of said core in its extended position being within the cavity, said movable core sections extending through the mold to the outside thereof, and said fixing means being at those ends of said sections that are outside of the mold.

10. Apparatus for making a molded article having a cavity, said apparatus comprising a core for use in a mold, said core having a part divided into a plurality of molding surface sections which are movable with respect to one another in a direction radially of the core from an extended molding position wherein they form a loop to a contracted article release position, alternate sections of the core constituting one group and the remaining sections constituting a second group, means fixing one end of every section together against relative movement while the opposite ends are movable between their extended and contracted positions, adjacent sections of the core being in contact with one another along surfaces that extend from the inside of the loop to the outside of the loop of the core, said core being of a shape to prevent direct axial separation movement of the molded article from the core when the core is radially extended and to permit such separation when the core is contracted, and in the radially contracted position having one group of sections moved radially inwardly of and overlapped by sections of the other group, and means for moving the core sections from one of their relative positions to the other, in the contracted positions of said core sections the entire molding surfaces of said one group of sections being spaced from contact with the other group to prevent relative rubbing of the parts of the outer surfaces of the sections of one group against the surfaces of the other group.

References Cited by the Examiner

UNITED STATES PATENTS

| 1,497,190 | 6/1924 | Moland. |
| 1,589,913 | 6/1926 | Wells _____ 264—266 |

ALEXANDER H. BRODMERKEL, *Primary Examiner.*

ROBERT F. WHITE, *Examiner.*